(12) United States Patent
Simmons et al.

(10) Patent No.: US 6,541,545 B1
(45) Date of Patent: Apr. 1, 2003

(54) GROUTING COMPOSITIONS

(75) Inventors: Walter John Simmons, Martinsburg, WV (US); Domenic Joseph Barsotti, Vineland, NJ (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 196 days.

(21) Appl. No.: 09/273,040

(22) Filed: Mar. 19, 1999

(51) Int. Cl.[7] .............................. C08L 67/06; C08L 5/00
(52) U.S. Cl. ................ 523/509; 156/327; 156/332; 156/336; 523/504; 523/505; 523/511; 523/514; 523/515; 523/527; 524/4; 524/5; 524/56; 524/57; 524/58; 524/906
(58) Field of Search ................ 156/327, 332, 156/336; 523/504, 505, 507, 511, 514, 515, 521, 527; 524/4, 5, 56, 57, 58, 906

(56) References Cited

U.S. PATENT DOCUMENTS

| 4,280,943 A | * | 7/1981 | Bivens et al. ............... 523/505 |
| 4,350,783 A | * | 9/1982 | Talbot ........................ 523/505 |
| 4,722,976 A | * | 2/1988 | Ceska ........................ 524/906 |

FOREIGN PATENT DOCUMENTS

| DE | 32 26 602 | * | 1/1984 | ................. 524/906 |
| JP | 1-190666 | | 7/1989 | ......... C07C/179/14 |

* cited by examiner

*Primary Examiner*—Peter Szekely

(57) ABSTRACT

An composition is provided which comprises a first component and a second component in which the first component comprises a peroxide, a liquid which comprises water, a sugar, and a solid particulate; and the second component comprises a polymer, a crosslinking agent, and a solid particulate. Also disclosed are processes for reducing fluid loss in a grouting composition and for anchoring a reinforcing member in a hole using the composition disclosed above.

15 Claims, No Drawings

GROUTING COMPOSITIONS

FIELD OF THE INVENTION

The present invention relates to a grouting composition.

BACKGROUND OF THE INVENTION

Anchor bolts are employed in various fields of engineering, for example, as strengthening or reinforcing members in rock formations and in structural bodies. The bolts are inserted into drill holes in the formation or body, and often are fixed or anchored, at their inner end or over substantially their entire length, by means of a reactive grouting composition which hardens around the bolt. When used in a mine roof, bolts grouted in this manner help significantly to prevent mine roof failure. Because unsupported rock strata have a tendency to move vertically and laterally, and this motion can cause the roof to fall, it is important that bolts be installed as soon as possible in a newly exposed roof and that the required strength provided by the hardening of the grouting composition be developed rapidly, e.g., in a matter of minutes, or within an hour or so, depending on the type of mine. Rapid hardening also contributes to the efficiency of the bolt installing operation.

A grouting composition generally contains a resin and water. Such a water-based composition is typically placed in boltholes using tubular compartmented cartridges and held rigid by an internal package pressure. The internal pressure is created by a cartridging machine when end clips are applied to the cartridge film to seal the contents. Water as a carrier in such systems results in a product with better shelf life than similar compositions containing oil-based carriers. However, water loss can occur with extended storage of the above components. Any loss of water from the cartridges, either by diffusion through the plastic or by leakage from the end clips, will cause loss of internal pressure. Without internal pressure the cartridges are limp, and when picked up at the center will sag greatly This limpness makes them very difficult to insert in close-fitting overhead boltholes. When enough water loss has occurred, the cartridges are too limp to be installed in the bolthole and must be destroyed. Since the polyester resin film has an appreciable water diffusion rate, some cartridge limpness may occur after about 2 months storage, and often unacceptable limpness may occur after 6 months storage.

Therefore, there is an increasing need to develop a water-based composition that can be used as grouting composition which can gel in a desired time and has a reduced water loss or an increased bonding strength.

SUMMARY OF THE INVENTION

According to the present invention, a composition which can be used as a grouting composition is provided. The composition comprises, consists essentially of, or consists of a first component and a second component in which the first component comprises a peroxide, a liquid which comprises water, a sugar, and a solid particulate; and the second component comprises a polymer, a crosslinking agent, and a solid particulate.

DETAILED DESCRIPTION OF THE INVENTION

Suitable peroxide can be an organic peroxide, an inorganic peroxide, or combinations thereof The presently preferred peroxide is an organic peroxide which can be any diacyl peroxides. Examples of suitable organic peroxides include, but are not limited to, benzoyl peroxide, dichlorobenzoyl peroxide, dibromobenzoyl peroxide, dimethoxy benzoyl peroxide, and combinations of two or more thereof The presently preferred organic peroxide is benzoyl peroxide because it is readily available and effective for use in a grouting composition.

Any liquid that comprises water can be used in the composition of the first embodiment of the invention. The liquid can also comprise a second liquid such as a freezing point depressing material. The second liquid can be a polyalcohol such as ethylene glycol and propylene glycol, solution of calcium chloride, solution of sodium chloride, and combinations of two or more thereof.

A suitable liquid can also comprise a thickener which keeps the liquid in diffused or well-mingled form. Examples of suitable thickeners include, but are not limited to, cellulose, methyl cellulose, hydroxyethyl cellulose, and combinations of two or more thereof A thickener can be present in the first component in any quantity that can thicken the liquid, generally in the range of from about 0.1 to about 30 weight %, based on the total weight of the liquid.

According to the invention, the term "sugar" refers to a carbohydrate selected from the group consisting of monosaccharide, disaccharide, trisaccharide, oligosaccharide having about 4 to about 25, preferably 4 to 20, repeat units per molecule, sugar alcohol, derivative thereof, and combinations of two or more thereof Generally a sugar employed herein is substantially soluble in water and does not substantially crystallize in water at ambient temperature. A sugar alcohol includes sugars having their carbonyl group converted to alcohol group such as sorbitol and mannitol. A sugar can also include one having one or more hydroxyl groups that have been alkylated such as, for example, methyl glyosides; having amino group such as, for example, glucosamine, galactasamine; in lactone forms such as, for example, gluconolactone, glucuronolactone, ascorbic acid, dehydroascorbic acid; containing one or more carboxyl groups such as N-acetyl muranic acid; and combinations of two or more thereof.

Specific examples of suitable sugars include, but are not limited to, glyceraldehyde, erythrose, threose, ribose, arabinose, xylose, lyxose, allose, altrose, glucose, mannose, gulose, idose, galactose, talose, ribulose, xylulose, psicose, fructose, sorbose, tagatose, sorbitol, mannitol, inasitol, gluonic acid, glucaric acid, gluconolactone, ascorbic acid, gluosamine, galactosamine, lactose, sucrose, rafinoise, melezitose, stachyose maltose, corn syrup, molasses, and combinations of two or more thereof The presently preferred sugars are corn syrup, sucrose, and molasses for they are inexpensive and readily available.

All sugars illustrated above can be either D or L configuration and can be either α or β stereoisomer.

A solid particulate is often served as filler in the composition of the invention to provide the interfacial strength and the desired rheological properties of the composition. The term "solid particulate" is interchangeable with the term "filler". Any solid particulate material that is substantially inert toward water and toward the materials in the composition into which it is to be incorporated can be used. Examples of suitable solid particulate include, but are not limited to, limestone (calcium carbonate), sand, cement, gypsum, gypsum plaster, fiber glass, paper fiber, and combinations of two or more thereof. Limestone and sand are preferred fillers, limestone being especially preferred because of pumping and cost considerations. Other solid particulate materials can be used, such as those described in U.S. Pat. No. 4,280,943, disclosure of which is herein incorporated by reference. Different particle sizes and shapes can be used, as can combinations of different fillers.

For maximum shelf life of a grouting composition disclosed in the invention, it is desirable that the solid particulate used be low in iron content (preferably below 0.001% by weight). If a filler which does contain any appreciable amounts of iron such as, for example, 0.001% or more by weight, it is preferable that sugar not be an aliphatic monosaccharide sugar having a carboxyl group. Preferably, when an iron-containing filler such as limestone is used as the particulate solid, the sugar used is selected from the group of disaccharides, sugar alcohols such as sorbitol, and oligosaccharides.

Peroxide can be present in the first component in any quantity as long as an effective grouting composition can be produced. Presently it is preferred that the peroxide be present in the first component in the range of from about 0.5 to about 10 weight percent (%), preferably about 1 to about 4%, and most preferably 1.5 to 2%.

The weight percent of the liquid in the first component of the invention composition can be any % as long as the percentage can provide a stabilized grouting composition. Generally, the weight % of liquid can be in the range of from about 5 to about 35%, preferably about 10 to about 30%, and most preferably 15 to 25%, based on the total weight of the first component.

The water content in the liquid can be in the range of from about 10 to about 100, preferably about 30 to about 75, and most preferably 40 to 70 weight %, based on the total weight of the liquid component. The second liquid, if present, makes up the rest of the liquid.

According to the present invention, the sugar can be present in the first component in any quantity so long as the quantity can provide a stabilized grouting composition. Generally the weight % of sugar in the first component can be in the range of from about 1 to about 30%, preferably about 2 to about 20%, and most preferably 5 to 10%.

Similarly, the solid particulate can be present in the first component in such an amount that can produce a stabilized grouting composition. The weight % of the solid particulate can be in the range of from about 50 to about 90%, preferably about 70 to about 85%, and most preferably 75 to 80%.

According to the invention, the second component comprises a polymerizable polymer. The polymerizable polymer, for example, can be the polymerized product of a polyalcohol and an ethylenically unsaturated polycarboxylic acid or acid anhydride. Examples of such acids or acid anhydrides, include, but are not limited to, nialeic acid, fumaric acid, maleic anhydride, phthalic anhydride, and combinations of two or more thereof An aliphatic polyalcohol can be ethylene glycol, propylene glycol, diethylene glycol, dipropylene glycol, 2-methyl-2,3-propanediol, or any dihydroxy compound that can be esterified with a carboxylic acid. Ethylene glycol or propylene glycol is preferred polyalcohol. Examples of presently preferred polymers include, but are not limited to, polymers having repeat units derived from (1) ethylene glycol, propylene glycol, diethylene glycol, or combinations of two or more thereof and (2) maleic anhydride, phthalic acid, or combinations thereof because of cost and stability over a wide temperature range for up to one year, low toxic properties, and relatively high flash point.

The polymer can be present in the second component in a quantity such that a grouting composition can be produced. Generally, the weight % of the polymer in the second component can be in the range of from about 5 to about 40%, preferably about 7 to about 30%, and most preferably 10 to 20%.

According to the invention, any crosslinking agent which can crosslink with a polymer disclosed above can be used. Examples of suitable crosslinking agents include, but are not limited to, styrene, vinyl toluene, ethylene, propylene, butene, pentene, hexene, acrylate, methacrylate, N,N-dimethylacrylate, and combinations of two or more thereof The presently preferred crosslinking agent is styrene because it is effective and readily available.

The quantity of the crosslinking agent required is the quantity that can produce a grouting composition having a reasonable gelling time and gel strength. Therefore, the crosslinking agent can be present in the second component in any quantity that can produce such grouting composition. The weight % of the crosslinking agent in the second component can be in the range of from about 1 to about 10%, preferably about 3 to about 7%.

The solid particulate, as disclosed above in the first embodiment of the invention, can be present in the second component in such an amount that can produce a stabilized grouting composition. The weight % of the solid particulate can be in the range of from about 50 to about 90%, preferably about 70 to about 85%, and most preferably 75 to 80%.

The second component can also comprise a promoter which can produce a sufficiently strong and stable grouting composition. The presently preferred promoter is an amine such as, for example, aniline, dimethyl aniline, diehtyl aniline, dipropyl aniline, dimethyl p-toluidine, or combinations of two or more thereof or a phenolic compound such as, for example, hydroquinone, hydroxy benzoic acids, or combinations of two or more thereof.

The promoter can be present in the second component in an amount that can produce a sufficiently strong and stable grouting composition. Generally, the amount can be in the range of from about 0.01 to about 5, preferably about 0.1 to about 3, more preferably about 0.15 to about 5, and most preferably 0.3 to 1 weight %, based on the total weight of the second component.

The second component can further comprise a sugar, a liquid, a stabilizer, or combinations of two or more thereof The definitions and examples of sugar, and liquid are the same as those disclosed above. The quantities of sugar, promoter, and liquid in the second component can also be the same as those disclosed above for the first component. A stabilizer such as a phenolic compound can be used in the composition in the range of from about 0.0001 to about 5 weight %. Specific examples of stabilizers include, but are not limited to, hydroquinone, p-hydroxybenzoic acid, aminophenol, and combinations of two or more thereof.

The first and second components can be produced by combining individual components using any suitable means known to one skilled in the art such as, for example, blending, mixing, or kneading. A grouting composition can be produced by combining the first and second components by the means disclosed in U.S. Pat. No. 4,280,943, disclosure of which is herein incorporated by reference.

Generally, the weight ratio of the first component to the second component can be in the range of from about 0.1:1 to about 10:1, preferably 1:1 to 1:5.

The composition of the present invention can be used for anchoring a strengthening or reinforcing member in a hole.

The present invention further provides a process which can be used to prevent, reduce, or control fluid loss in a grouting composition. The process comprises combining the composition with a sugar in which the composition comprises a first component and a second component. The first component comprises a peroxide, a liquid which comprises water, and a solid particulate. The second component comprises a polymer and a crosslinking agent. The definition, scope, and quantity of sugar, peroxide, liquid, solid particulate, polymer, and crosslinking agent are the same as those disclosed above.

The following examples are provided to further illustrate the invention and are not to be construed as to unduly limit the scope of the invention.

EXAMPLE 1

Compositions having a first component and a second component were prepared and mixed in several ratios. The first component comprised a mixture of CORNSWEET® 42 and thickened water in varying amounts from 0 to 100% of CORNSWEET® 42. CORNSWEET® 42 is a high fructose corn syrup available from ADM Company, Inc., Decatur, Ill. containing 71% solids, and approximately 42% fructose, 52% dextrose, and 6% higher saccharides (oligosaccharides). Thickened water was prepared by mixing potable water with 1.2% of hydroxyethyl cellulose thickening agent. Compositions of mixtures of CORNSWEET® 42 and thickened water are provided in Table 1.

TABLE 1

| Mixture | Thickened Water grams | CORNSWEET® 42 grams | % of water | % total mix |
|---|---|---|---|---|
| A | 170.0 | 0.0 | 0.0 | 0.0 |
| B | 148.8 | 21.2 | 12.5 | 2.1 |
| C | 137.5 | 42.5 | 23.6 | 4.2 |
| D | 85.0 | 85.0 | 50.0 | 8.5 |
| E | 42.5 | 137.5 | 76.4 | 13.6 |
| F | 0.0 | 170.0 | 100.0 | 17.0 |

The first component further comprised limestone fillers, which comprised an equal amount of type I limestone and type III limestone. Type I limestone is a high calcium limestone, of which 97.5% to 100% passed a 50 mesh screen, 90% to 97.5% passed a 100 mesh screen, and 73% to 83% passed a 200 mesh screen. Type III limestone is a 16×200 high calcium limestone, of which 0% was retained on a 16 mesh screen, 10% was retained on a 10 mesh screen, 21% was retained on a 30 mesh screen, 38% was retained on a 50 mesh screen, 21% was retained on a 100 mesh screen, 3% was retained on a 120 mesh screen, 4% was retained on a 200 mesh screen and 3% passed through the 200 mesh screen.

The first component further comprised benzoyl peroxide, which was a 50/50 mixture of two commercial grade pastes of 55% benzoyl peroxide and plasticizers, BTW-55C and B55-107D4, available from Akzo Chemicals, Inc., Chicago, Ill. and Norac Co., Inc., Azusa, Calif., respectively.

A series of first component compositions was prepared by combining in a planetary mixer, 400 grams of type I limestone, 400 grams of type III limestone, 30 grams of the benzoyl peroxide mixture, and 170 grams of one of the mixtures, A-F, of CORNSWEET® 42 and thickened water, for a total of 1000 grams.

The second component comprised approximately 16% of a polyester resin formulation and 84% limestone filler. The resin formulation was described as "quick cure resin", available from Reichhold Chemicals, Inc., Research Triangle Park, N.C. "Quick cure resin" has a gel time of 9.5 to 12.5 seconds at 77° F. (25° C.), when the resin is mixed with a benzoyl peroxide catalyst, such as those described in U.S. Pat. No. 4,280,943. The limestone filler was approximately 50% type I limestone (described above), and 50% type II limestone. Type II limestone is a high calcium limestone, of which 0% was retained on 4 mesh screen, 95% to 100% passed a 8 mesh screen, 50% to 90% passed a 16 mesh screen, 20% to 60% passed a 30 mesh screen and 6 to 26% passed a 50 mesh screen.

Six samples of the second component were weighed as 13 gram portions into plastic cups. The cups were placed in a constant temperature water bath at 77° F. (25° C.) for 1 hour.

A sample of each first component composition containing one of the mixtures A-F from Table 1, was weighed as a 7 gram portion into a plastic cup. The cup was also placed in the water bath for 1 hour. After 1 hour, the two components were then combined and mixed rapidly by hand with a spatula until they gelled. The time from when mixing started until the sample gelled was measured and recorded to the nearest 1/10 second. The gel time was measured three times and the results are shown below in Table 2. The values in the last column are the average gel time of the three measurements.

TABLE 2

| CORNSWEET® 42 Mixture | CORNSWEET® 42 % | Gel Time seconds | Avg. Gel Time seconds |
|---|---|---|---|
| A | 0.0 | 11.7; 12.1; 11.4 | 11.7 |
| B | 12.5 | 11.5; 11.7; 10.7 | 11.3 |
| C | 23.6 | 11.1; 11.1; 11.1 | 11.1 |
| D | 50.0 | 10.2; 10.3; 10.4 | 10.3 |
| E | 76.4 | 9.8; 9.7; 10.1 | 9.9 |
| F | 100.0 | 9.4; 9.5; 9.3 | 9.4 |

Table 2 shows that an increase in percent of sugar, as CORNSWEET® 42, produced faster gel times. A faster gel time was observed when as little as 12.5% of the thickened water was replaced by CORNSWEET® 42 or 2.1% of the first component. This amount of CORNSWEET® 42 corresponded to 1.5% "sugar" in the first component.

The run was repeated using 6 grams of the first component instead of 7 grams and the results are shown in Table 3 below.

TABLE 3

| CORNSWEET® 42 Mixture | CORNSWEET® 42 % | Gel Time seconds | Avg. Gel Time seconds |
|---|---|---|---|
| A | 0.0 | 12.9; 11.1 | 12.05 |
| B | 12.5 | 12.5; 11.0 | 11.75 |
| C | 23.6 | 12.3; 10.8 | 11.55 |
| D | 50.0 | 11.7; 11.0 | 11.35 |
| E | 76.4 | 10.5; 9.9 | 10.2 |
| F | 100.0 | 10.3; 9.9 | 10.1 |

While the gel times in Table 3 are slower than those in Table 2 due to a reduction in the amount of benzoyl peroxide catalyst, this reduction in catalyst could be compensated for by increasing the CORNSWEET® 42, i.e., sugar, in the first component.

EXAMPLE 2

The process of Example 1 was repeated using different compositions for the first and second components. In the first component, alternative sugars were used in place of the CORNSWEET® 42, and in the second component, the polyester resin was varied.

In the first component, a liquid, either thick water or a sugar, was used. The thick water was the same as that used in Example 1, i. e., a solution of potable water containing 1.20% of hydroxyethyl cellulose thickening agent. CORNSWEET® 42 and "Grandma's Molasses", which was purchased from a local grocery store, were used without modification. Fructose and sucrose samples were prepared by adding solid fructose or sucrose to boiling water and allowing to cool to room temperature before proceeding. The liquid is identified in Table 4.

To prepare the first component, 170 grams of the liquid, 30 grams of the benzoyl peroxide mixture used in Example 1, 400 grams of type I limestone and 400 grams of type III limestone were combined in a planetary mixer.

For the second component, different polyester resin formulations were used, which included "quick-cure resin", "½ minute resin" and "1 minute resin", all available from Reichhold Chemicals, Inc., Research Triangle Park, N.C. The resins differed in the amounts of inhibitors and promoters. The slower gel time resins have fewer promoters and are slower to gel when mixed with the peroxide component. The specification for the "½ minute resin" was a gel time of 16 to 19 seconds at 77° F. (25° C.). For the "1 minute resin", the specified gel time was 29 to 33 seconds at this temperature.

Samples were prepared as in Example 1, combining 7 grams of component 2 with 13 grams of component 1 and mixing rapidly until gelling occurred. The average gel times of three tests for each mix are provided in Table 4 for each of the resins.

TABLE 4

| | Average Gel Time, Seconds | | |
|---|---|---|---|
| Liquid | Quick-Cure | ½ Min. | 1 Min. |
| Thick water | 13.5 | 16.1 | 30.2 |
| CORNSWEET ® 42 | 11.6 | 12.7 | 27.0 |
| "Grandma's Molasses" | 12.3 | 13.2 | 27.3 |
| 71% Fructose/29% Water | 12.4 | 14.1 | 29.7 |
| 71% Sucrose/29% Water | 11.6 | 13.4 | 29.0 |
| 29% Fructose/71% Water | 10.2 | 13.4 | 30.5 |
| 29% Sucrose/71% Water | 10.3 | 13.1 | 31.1 |

Table 4 demonstrates that use of sugars in grouting compositions increased the gelation rate with both "quick-cure resin" and "½ minute resin". With the 1 minute resin, it appeared that higher sugar content was needed to increase gelation rate. The amount of increase was most pronounced in the faster gel times. This is significant since the need is in decreasing the gel times of the faster resins.

EXAMPLE 3

The process of Example 2 was repeated using "quick cure resin" in component 2, with the exceptions that Corn Syrup 42/43 and a sorbitol solution, both available from ADM Company, Inc., Decatur, Ill., were compared to thickened water as the liquid in the first (benzoyl peroxide) component. The corn syrup was diluted with water to 70% syrup, 30% water (56% solids). The sorbitol solution was diluted with water to 75% sorbitol, 25% water (53% solids). Both the corn syrup and sorbitol solutions contained 0.07% of hydroxyethyl cellulose thickening agent. Thick water was prepared as described in Example 1.

For component 1, 209 grams of liquid, 30 grams of benzoyl peroxide, 380 grams of type I and 380 grams of type III limestone were combined in a planetary mixer. The gel time was determined as in Example 1, using a ratio of 7 grams of component 1 component to 13 grams of component 2 at 25° C.

TABLE 5

| Liquid | Gel Time (Seconds) |
|---|---|
| Thick Water (control) | 13.7 |
| Corn Syrup 42/43 | 11.5 |
| Sorbitol Solution | 12.4 |

Table 5 shows that compositions containing the sugar, either corn syrup or sorbitol, had an increased gelation rate.

EXAMPLE 4

CORNSWEET® 42 was mixed with "quick-cure" resin by combining in a planetary mixer. Table 6 shows the compositions made.

TABLE 6

| Mixture | Resin, grams | CORNSWEET ® 42, grams |
|---|---|---|
| A | 160 | 0 |
| B | 140 | 20 |
| C | 120 | 40 |
| D | 80 | 80 |
| E | 0 | 160 |

The viscosity of the mixes were measured using a Brookfield viscometer at 1, 10 and 100 RPM using a #5 spindle. The RPM was varied to obtain viscosities at varying shear rates. The mixes were then aged at 70° C. for 10 days and the viscosity measured again. Aging at 70° C. for 10 days approximately equals one year shelf life at 25° C. An increase in viscosity indicates that unwanted polymerization was occurring. Table 7 below shows the viscosities for the mixes, with the first number indicating the initial viscosity and the second number the viscosity after aging.

TABLE 7

| | Mixture | | | | |
|---|---|---|---|---|---|
| RPM | A | B | C | D | E |
| 1 | 3.2; 3.7 | 5.0; 1.2 | 6.4; 0.2 | 14.1; 4.4 | 0.1; 0.0 |
| 10 | 5.6; 8.6 | 9.8; 4.2 | 11.8; 1.3 | 24.4; 12.6 | 0.4; 0.4 |
| 100 | 20.1; 28.8 | 27.2; 19.7 | 32.8; 10.7 | 59.8; 38.1 | 4.5; 4.5 |

Table 7 shows that the all mixes containing CORNSWEET® 42 decreased time, whereas the control mix A increased in viscosity with time. A decrease in vicosity is desirable because it will perform better for bolt insertion over a longer period of time.

EXAMPLE 5

Component 1 compositions of Example 3, ADM corn syrup 42/43 and ADM sorbitol solution, were compared to thickened water in an accelerated drying test. Ten gram of each of the mixes were placed in an open-top 100 ml plastic beaker. The weight loss in grams was determined over a 120 hour period, as shown in Table 8 below.

TABLE 8

| Hours | Thick Water | Corn Syrup 42/43 | Sorbitol solution |
| --- | --- | --- | --- |
| 0 | 0 | 0 | 0 |
| 5 | 0.3 | 0.1 | 0.1 |
| 10 | 1.2 | 0.2 | 0.2 |
| 24 | 1.4 | 0.2 | 0.2 |
| 48 | 1.7 | 0.2 | 0.4 |
| 120 | 1.7 | 0.5 | 0.6 |

Table 8 shows that the corn syrup and sorbitol significantly reduced the water loss of grouting compositions by a factor of three in the first 5 hours and a factor of 6 to 7 in 10 to 24 hours. After 48 hours the thickened water mix had lost most of its water.

EXAMPLE 6

This example illustrates the bonding strength of grouting compositions of the present invention. The strength is an important measure of field performance.

Component 1 compositions were made as in Example 1 to compare sucrose and CORNSWEET® 42 corn syrup mixes with those using the thick water of Example 1. "Liquid Sucrose Sugar", available from Savannah Foods and Industries, Inc., Savannah, Ga., was used as the source of sucrose. Thickened water was prepared as in Example 1. The benzoyl peroxide (BPO) paste was also the same composition as the mixture in Example 1. Compositions are provided in Table 9, with amounts provided in weight percents. Component 1 (benzoyl peroxide mix) and component 2 (resin) were then placed in typical two-component cartridges for bolt-hole insertion of the type described in U.S. Pat. No. 4,280,943.

TABLE 9

| | Mix | | |
| --- | --- | --- | --- |
| Ingredient | A | B | C (control) |
| Cornsweet ® 42 | 17% | | |
| "Liquid Sucrose Sugar" | | 17% | |
| Thickened Water | | | 17.2% |
| BPO paste | 3.0% | 3.0% | 4.4% |
| type I limestone | 40% | 40% | 39.2% |
| type III limestone | 40% | 40% | 39.2% |

For these tests, a hole which was one inch (2.54 cm) in diameter was drilled 12 inches (30.5 cm) into a limestone block, and a two-component cartridge inserted in the hole. A ⅝ inch diameter headed rebar bolt (a reinforcing bar with a forged head) was inserted into the two-component cartridge using a hand-drill rotating at about 400 rpm. Insertion took approximately 5 to 8 seconds. Rotation was started at the time of insertion and continued for approximately 8 to 10 seconds. The bonding strength was measured 10 minutes after insertion by measuring the maximum force required to pull the bolt out of the hardened resin grout, using a hydraulic jack. The test was repeated 3 times for each sample composition, and the force required was averaged.

The control bolt composition C required 16.3 tons pull. The sucrose mix composition B required 18.0 tons pull. The CORNSWEET® 42 composition A also required 18.0 tons pull. A CORNSWEET® 42 composition also containing 0.002% of hydroxyethyl cellulose thickener required 17.5 tons pull. These results indicate that the corn syrup compositions and sucrose compositions are approximately equal in bonding strength and superior to the control test which did not contain a sugar.

EXAMPLE 7

This example shows the improved chemical stability of benzoyl peroxide (BPO) when using a sugar as a diluent, as compared to other BPO compositions. Two commercial BPO compositions, which contained about 55% BPO and plasticizers, were used, BTW-55DC and B55-107D4, available from Akzo Chemicals, Inc. and Norac Co., Inc., respectively, as described in Example 1. A mixture of CORNSWEET® 42 and BPO was prepared by mixing 8.5 grams of BPO solids (6% water) and 7.8 grams of CORN-SWEET® 42 with a mortar and pestle to provide a smooth paste containing about 49% BPO. A simple mixture of BPO in water, containing 91.6% BPO, without plasticizers added was also used for comparison.

The BPO content was measured using the iodometric method in which the BPO is reduced by adding iodide ion in acetic acid solution, and the iodine liberated by this reaction is titrated with a standardized sodium thiosulfate solution. Stability data is provided in Table 10 in terms of percent loss of BPO, over a number of days.

TABLE 10

| Days @ 50° C. | CORNSWEET ® mix | B55-107D4 | BTW-55DC | BPO/water mix |
| --- | --- | --- | --- | --- |
| 0 | 0.0% | 0.0% | 0.0% | 0.0% |
| 13 | | 1.9% | 0.91% | 0.66% |
| 18 | 1.22% | | | |
| 27 | | 5.5% | 5.6% | 0.44% |
| 38 | −1.02% | | | |
| 48 | | 16% | 11% | 0.66% |
| 54 | −0.20% | | | |
| 77 | | 40% | 28% | 1.5% |

The above results show essentially no loss of BPO in the sample containing the CORNSWEET® 42, while the commercial samples show losses of up to 16% after about 50 days. While plasticizers are useful to maintain BPO in suspension for safe handling and pumping, plasticizers accelerate decomposition of BPO. In a simple mix of BPO and water, while decomposition is reduced, BPO does not remain suspended ended and settles. Sugars decrease rate of BPO decomposition as well as keep the BPO suspended.

EXAMPLE 8

This example shows the effect of iron in the solid particulate on benzoyl peroxide stability when CORNSWEET 42 is used as the sugar. In the following tests, the ingredients were weighed into a polypropylene beaker and mixed using a spatula or putty knife to a paste-like consistency. The ingredients were added in the order given in the Table 11 to provide Mixes A and B. The benzoyl peroxide was the same paste (BPO paste) as the mixture of Example 1. The type I limestone had an iron content of 0.06%, and the $CaCO_3$ had an iron content below 0.001%, as measured by X-ray fluorescence.

TABLE 11

| Composition | Mix A | Mix B |
| --- | --- | --- |
| CORNSWEET ® 42 | 24.3% | 29.1% |
| BPO paste | 3.3% | 3.6% |
| Type I Limestone | 72.1% | |
| Reagent grade $CaCO_3$ | | 67.6% |

The mixes were capped and placed in a 50° C. oven to accelerate BPO decomposition. At time intervals, the samples were removed from the oven, cooled to room temperature, and measured for benzoyl peroxide content. The results are provided in Table 12.

TABLE 12

| BPO Composition | Mix A | Mix B |
|---|---|---|
| Initial value | 1.84% | 2.01% |
| After 1 day at 50° C. | 1.70% | 1.87% |
| After 2 days at 50° C. | 1.53% | 1.88% |
| After 5 days at 50° C. | 0.49% | 1.71% |
| After 7 days at 50° C. | 0.19% | 1.76% |

Table 12 shows the harmful effect of iron in the limestone on benzoyl peroxide stability when using CORNSWEETS® 42 as the sugar.

EXAMPLE 9

This example shows the effect of various sugars when combined with a solid particulate containing iron. Samples were prepared and tested as in Example 8. The compositions are provided in Table 13 and the results are provided in Table 14.

TABLE 13

| Composition | Mix C | Mix D | Mix E | Mix F |
|---|---|---|---|---|
| CORNSWEET® 42 | 29.3% | | | |
| 70% Fructose | | 29.3% | | |
| 70% Dextrose | | | 29.3% | |
| 70% Maltose | | | | 29.3% |
| BPO Paste | 3.5% | 3.7% | 3.6% | 3.4% |
| Type I Limestone | 67.3% | 67.3% | 67.3% | 67.3% |

TABLE 14

| BPO Concentration | Mix C | Mix D | Mix E | Mix F |
|---|---|---|---|---|
| Initial value | 1.9 | 2.0 | 2.0 | 1.9 |
| After 1 day at 50° C. | 1.7 | 1.7 | 1.9 | 1.9 |
| After 4 days at 50° C. | 0.3 | 0.0 | 1.6 | 1.6 |
| After 6 days at 50° C. | 0.0 | 0.0 | 1.6 | 1.6 |
| After 11 days at 50° C. | 0.0 | 0.0 | 1.0 | 1.2 |

Table 14 shows that sugars containing fructose (CORNSWEET® 42 and fructose) had a harmful effect on benzoyl peroxide stability when used in the presence of a particulate solid containing iron, as compared to the use of sugars which did not contain fructose (dextrose and maltose).

What is claimed is:

1. A grouting composition comprising a first component and a second component wherein said first component comprises a peroxide, a liquid which comprises water, a sugar, and a solid particulate; and said second component comprises a polymer, a crosslinking agent, and a solid particulate.

2. A composition according to claim 1 wherein said second component further comprises said liquid, said sugar, and said solid particulate.

3. A composition according to claim 1 or claim 2 wherein said peroxide is selected from the group consisting of benzoyl peroxide, dichlorobenzoyl peroxide, dibromobenzoyl peroxide, dimethoxy benzoyl peroxide, and combinations of two or more thereof.

4. A composition according to claim 1 or claim 2 wherein said peroxide is benzoyl peroxide.

5. A composition according to claim 1 or claim 2 wherein said liquid further comprises a freezing point-depressing material.

6. A composition according to claim 5 wherein said freezing point-depressing material is ethylene glycol.

7. A composition according to claim 1 or claim 2 wherein said sugar is selected from the group consisting of monosaccharides, disaccharides, trisaccharides, tetrasaccharides, oligosaccharides having about 5 to about 25 monosaccharide units, and combinations of two or more thereof.

8. A composition according to claim 7 wherein said sugar is selected from the group consisting of glyceraldehyde, erythrose, threose, ribose, arabinose, xylose, lyxose, allose, altrose, glucose, mannose, gulose, idose, galactose, talose, ribulose, xylulose, psicose, fructose, sorbose, tagatose, sorbitol, mannitol, inasitol, gluonic acid, glucaric acid, gluconolactone, ascorbic acid, gluosamine, galactosamine, lactose, sucrose, raffinose, melezitose, maltose, corn syrups, molasses, N-acetylmuramic acid, and combinations of two or more thereof.

9. A composition according to claim 7 wherein said sugar is corn syrup.

10. A composition according to claim 1 or claim 2 wherein said solid particulate is selected from the group consisting of calcium carbonate, limestone, sand, cement, gypsum, fiber glass, paper fibers, and combinations of two or more thereof.

11. A grouting composition comprising a first component and a second component wherein said first component comprises a peroxide, a liquid which comprises water, a sugar, and a solid particulate; and said second component comprises a polymer, a crosslinking agent, said liquid, said sugar, and said solid particulate;

said peroxide is selected from the group consisting of bezoyl peroxide, dichlorobenzoyl peroxide, dibromobenzoyl peroxide, dimethoxy benzoyl peroxide, and combinations of two or more thereof;

said sugar is selected from the group consisting of monosaccharides, disaccharides, trisaccharides, tetrasaccharides, oligosaccharides, and combinations of two or more thereof; and said solid particulate is selected from the group consisting of calcium carbonate, limestone, sand, cement, gypsum, fiber glass, paper fibers, and combinations of two or more thereof.

12. A composition according to claim 11 wherein said peroxide is benzoyl peroxide, said liquid further comprises ethylene glycol, said sugar is sorbitol, said solid particulate is calcium carbonate, and said crosslinking agent is styrene.

13. A composition according to claim 11 wherein said sugar does not crystallize in said liquid at ambient temperature.

14. A process for reducing fluid loss in a grouting composition comprising combining said grouting composition with a sugar wherein said grouting composition comprises a first component and a second component; said first component comprises a peroxide, a liquid which comprises water, and a solid particulate; said second component comprises a polymer and a crosslinking agent.

15. A process for anchoring a reinforcing member in a hole comprising contacting said member with a grouting composition which comprises a first component and a second component; said first component comprises a peroxide, a liquid which comprises water, a sugar, and a solid particulate; and said second component comprises a polymer and a crosslinking agent.

* * * * *